United States Patent [19]

Brown et al.

[11] 4,199,393

[45] Apr. 22, 1980

[54] APPARATUS FOR FORMING THE BEAD AND SIDEWALL PORTIONS OF A PNEUMATIC TIRE AND APPARATUS AND METHOD OF MAKING THE SAME

[75] Inventors: Robert L. Brown, Akron; Kenneth W. Dunaway, Massillon; Virgil E. Henley, Akron, all of Ohio

[73] Assignee: The General Tire & Rubber Company, Akron, Ohio

[21] Appl. No.: 939,946

[22] Filed: Sep. 6, 1978

[51] Int. Cl.² ........................................... B29H 17/12
[52] U.S. Cl. ..................................... 156/401; 156/132
[58] Field of Search .................... 156/132, 394 R, 401, 156/414–420, 398

[56] References Cited

U.S. PATENT DOCUMENTS

| | | | |
|---|---|---|---|
| 3,171,769 | 3/1965 | Henley et al. | 156/132 |
| 3,184,360 | 5/1965 | Nadler et al. | 156/401 |
| 3,475,254 | 10/1969 | Henley | 156/401 |
| 3,490,980 | 1/1970 | Mallory et al. | 156/401 |
| 3,692,605 | 9/1972 | Cantarutti | 156/132 |
| 3,694,290 | 9/1972 | Pacciarini et al. | 156/132 |
| 3,721,600 | 3/1973 | Cantarutti | 156/401 |
| 3,740,293 | 6/1973 | Jones et al. | 156/415 |
| 3,776,793 | 12/1973 | Frazier | 156/132 |
| 3,833,445 | 9/1974 | Mallory et al. | 156/401 |
| 3,966,536 | 6/1976 | Schmitt | 156/132 |
| 4,087,306 | 5/1978 | Head et al. | 156/132 |

*Primary Examiner*—John E. Kittle

[57] ABSTRACT

A tire building apparatus is provided having an improved mechanism for turning up the plies of the tire carcass and wrapping them around each tire bead ring. The mechanism is designed so that it can also be used to apply the sidewall pads to the expanded carcass of a radial tire. The improved mechanism includes a bladder that has a molded conical portion in its outer fold adjacent the building drum. This conical portion extends very close to the bead ring positioned adjacent the carcass at the sides of the drum shoulders. The improved mechanism also includes a control ring insert placed inside said bladder and radially inwardly from the conical portion of the outer bladder fold. When the bladder is inflated to wrap the carcass plies around the bead ring, the control ring insert and the molded conical portion of the outer bladder fold combine to provide an improved, tighter wrapping of the carcass plies around the bead ring. They also provide a smoother, more accurate positioning of a sidewall pad to an expanded radial tire carcass when the mechanism is employed for that purpose. There is also provided a method and apparatus for molding a bladder having a conical portion in its outer fold.

5 Claims, 9 Drawing Figures

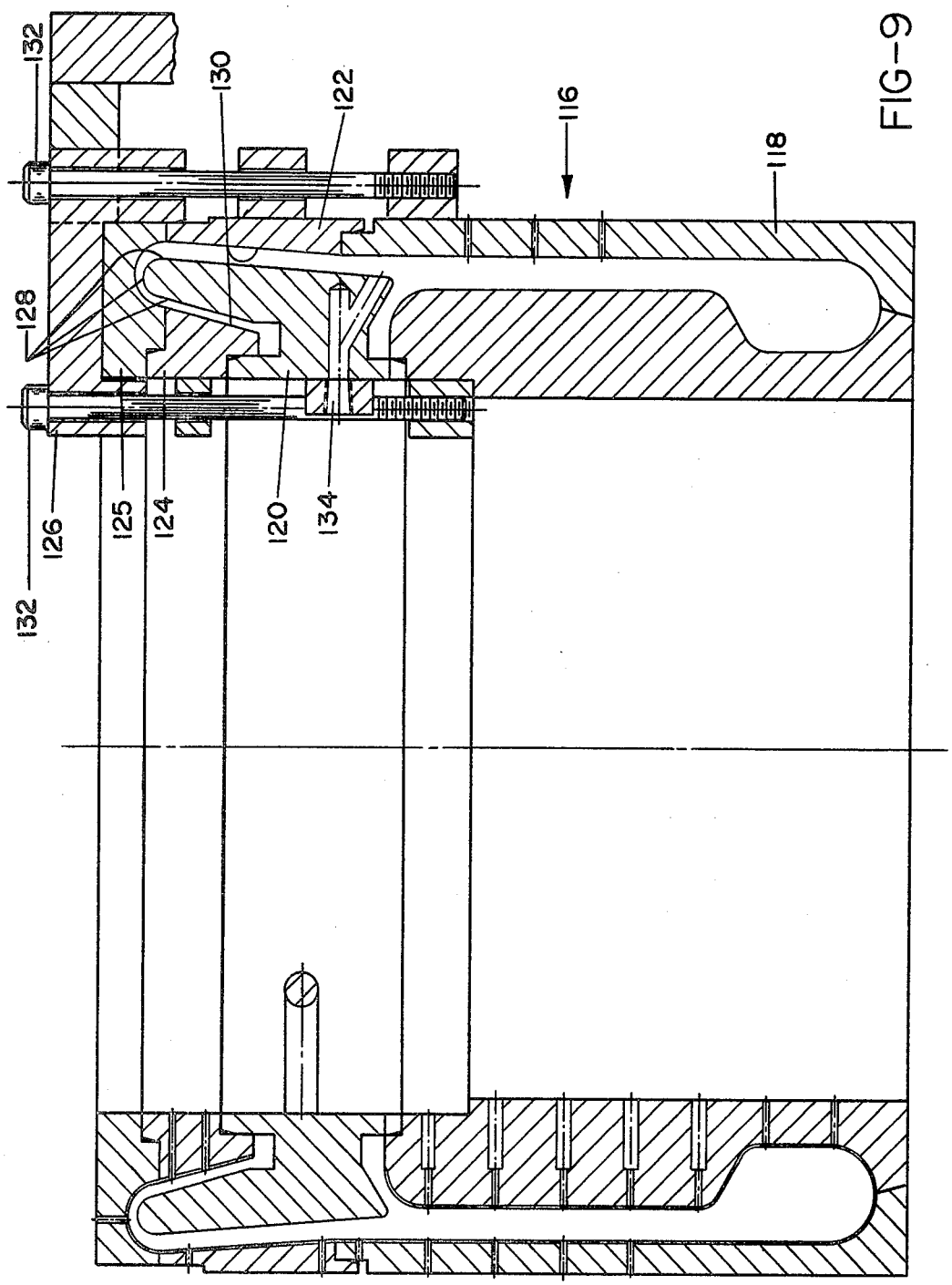

APPARATUS FOR FORMING THE BEAD AND SIDEWALL PORTIONS OF A PNEUMATIC TIRE AND APPARATUS AND METHOD OF MAKING THE SAME

FIELD OF THE INVENTION

The invention relates to a tire building apparatus having an improved mechanism for turning up the plies of a tire carcass. The mechanism can also be used to apply sidewalls to the expanded carcass of a radial tire. The invention also relates to an apparatus and method of making an improved bladder that forms part of the carcass ply turn-up mechanism.

BACKGROUND OF THE INVENTION

The mechanism for turning up the plies of a tire carcass and wrapping them around the bead rings usually includes a pair of toroid shaped inflatable turnover bladders located at each end of the drum. Examples of such pairs of bladders are shown in U.S. Pat. No. 3,171,769 to V. E. Henley and R. W. Phillips and U.S. Pat. No. 3,475,254 to V. E. Henley, both assigned to the assignee of the present invention. The construction and operation of the turnover bladders is shown and described in FIGS. 10, 11, 12, 13, 14, and 15, and column 8, line 11 to column 10, line 9 of U.S. Pat. No. 3,171,769, and in FIGS. 25, 26, and 27, and column 2, line 62 to column 13, line 11 of U.S. Pat. No. 3,475,254. Briefly, each turnover bladder is positioned radially inwardly of the bead ring and is inflated with the ends of the carcass plies laying on its top surface so as to carry these ply ends upwardly and around the bead ring. Then, the bladder is partially deflated, and a pushover ring, usually carried by the bead ring carrier, moves in and squeezes the bladder and the turned-over ply end against the carcass.

Other patents, in addition to the two mentioned above, that show various kinds of carcass ply turnover bladders are U.S. Pat. No. 3,692,605 to Cantarutti, U.S. Pat. No. 3,721,600 to Cantarutti, U.S. Pat. No. 3,740,293 to Jones and Cantarutti, U.S. Pat. No. 3,776,793 to Frazier, U.S. Pat. No. 3,184,360 to Nadler et al., U.S. Pat. No. 3,490,980 to Mallory et al., and U.S. Pat. No. 3,833,445 to Mallory et al. The two Cantarutti patents, the Jones patent, and the Frazier patent are of particular interest because they show ply turnover bladders that are also used to apply sidewall pads to the expanded carcass of a radial tire, which is one of the capabilities of the turnover bladder of the present invention. The Cantarutti and Jones patents also show an insert member within the inner marginal portion of the bladder during the various operations performed by the bladder. The present invention also uses an insert member within the bladder, but this insert contacts the bladder only after the bladder has expanded a slight amount toward the bead ring. More distinctions between the apparatus of the Cantarutti and Jones patents and that of the present invention will be evident from the following explanation and description of the present invention.

One of the main problems with past apparatus for wrapping carcass plies around bead rings has been achieving a uniform tight wrapping of the plies, and obtaining a ply wrapping that is free of trapped air bubbles. To accomplish this, it is important that when the turnover bladder is deflated, its top surface be positioned very close to the bead rings so that the carcass plies lying on top of the bladder directly under the bead ring do not have to be lifted very far during the wrapping operation. However, a factor which in the past has stood in the way of such positioning of the turnover bladder is that the bladder must be of a small enough diameter when deflated that it does not interfere with the bead ring or bead ring setting mechanism while the bead ring is being carried over the turnover bladder to place it adjacent the carcass plies at the end of the building drum.

Another problem in achieving tight wrapping of the carcass plies is the fact that the bladder during its initial expansion must pull the ends of the plies axially outwardly away from the drum while lifting them into contact with the bead ring, and then the same bladder must, on further expansion, carry the plies back in the axially opposite direction and over the bead ring. This requires a bladder that expands first in one direction and then rolls back in the other direction. Such expansion has been difficult to accomplish with prior bladders, particularly with regard to controlling the time at which the bladder changes its direction of expansion.

SUMMARY OF THE INVENTION

The present invention solves the foregoing problems by providing a bladder that has a conical shape with a molded crease in its portion nearest the drum, and a control ring insert positioned underneath this conical portion. The conical portion has its largest diameter at the end of the bladder nearest the bead ring and allows that portion of the bladder to be placed extremely close to the bead ring while allowing clearance between the lesser diameter parts of the bladder and the bead ring and the bead ring carrier that must be moved over the deflated bladder. The conical portion of the bladder has a shape that is molded into the bladder, and there is also a rounded, molded crease in the bladder at its large diameter end that rolls the carcass plies over the bead ring during expansion of the bladder. After the conical portion and molded crease are lifted a slight amount to start wrapping the carcass plies around the bead ring, the end of the control ring insert engages a portion of the inner fold of the bladder beneath the conical portion and thereby controls the amount that the bladder lifts toward the tire bead as well as the degree to which the bladder expands axially outward before rolling back over the tire bead. The control ring insert and the rounded molded crease in the bladder thus combine to wrap the carcass plies tightly around the bead ring in a controlled manner that achieves a more uniform wrapping with less trapped air.

The apparatus of the invention can also be used to apply sidewall pads. For this operation, the control ring insert remains in the same position as for the ply turnover operation, and the expansion of the bladder, controlled by the ring insert, is very similar in both operations. In the case of the sidewall pad application, however, the control ring insert serves primarily the function of forcing the bladder to pivot at a fixed location that is a fixed distance from the place on the carcass where the end of the sidewall pad is to be located. This enables accurate placement of the sidewall pads on the carcass. The control ring insert also has a conical outer surface that supports the conical bladder portion and gives firm support to the contoured sidewall pad when it is positioned over the bladder. This support is of particular advantage when the ends of the sidewall pad are being stitched together prior to applying the sidewall pad to the carcass.

In controlling the expansion of the bladder during application of the sidewall pads, the control ring insert of the present invention serves a purpose similar to the insert of U.S. Pat. Nos. 3,692,605 and 3,721,600 to Cantarutti and U.S. Pat. No. 3,740,293 to Jones and Cantarutti. However, in turning up the carcass plies, the insert of the present invention functions differently than those of the Jones and Cantarutti patents. The inserts of the Cantarutti patents are retracted during the carcass ply turnup and consequently have no effect on that operation. The insert of the Jones and Cantarutti patent is positioned directly under the bead ring and engages the bladder even during the initial stage of its expansion. These differences, added to the present invention's molded conical shape on the portion of the bladder nearest the bead ring, result in the apparatus of the present invention functioning quite differently from the Cantarutti and Jones apparatus, and producing an improved, tighter wrap of the carcass plies around the bead ring.

The present invention also includes an apparatus and method for molding a turnover bladder having a conical portion. This aspect of the invention involves placing the uncured bladder in an external mold having an annular cavity of V-shaped cross-section and then prior to the final curing of the bladder, placing an internal mold insert within the annular V-shaped cavity. The surfaces of the mold insert are spaced from the external V-shaped cavity so that they form a bladder section of exactly the desired thickness. Since this portion of the bladder is so important in the operation of the bladder, it is very important that it be dimensioned accurately. The molding apparatus and method disclosed and claimed herein accomplish that objective.

These and other features, advantages, and objects of the present invention will be more apparent from the following detailed description and the attached drawings.

DESCRIPTION OF THE DRAWINGS

FIG. 9 is a cross-section of a mold apparatus for molding and curing the turnover bladder of FIGS. 1 through 8.

DESCRIPTION OF A PREFERRED EMBODIMENT

Figure 1:
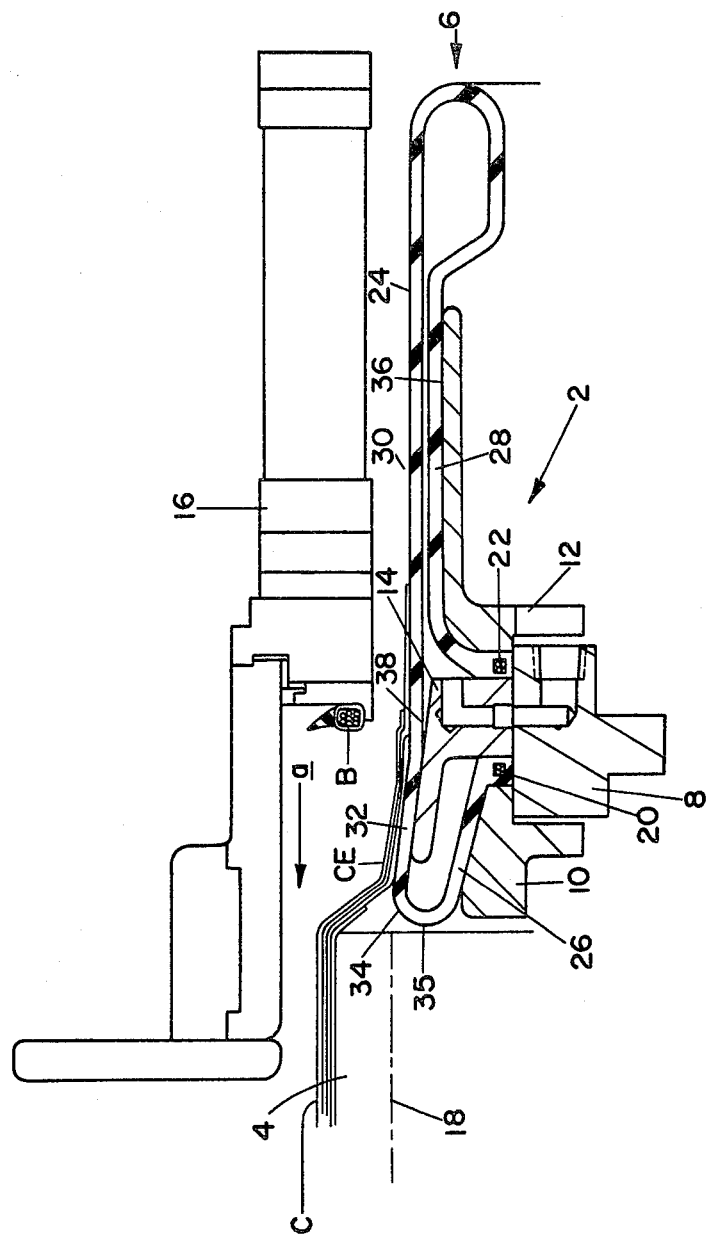
FIG. 1 is a partial cross-section of a tire building apparatus including a tire building drum, a completely deflated turnover bladder and associated equipment for turning up the ends of the carcass plies and for applying a sidewall pad to the carcass, and a bead ring carrier in the process of setting a bead ring adjacent the carcass plies.

Referring to FIG. 1, a tire building apparatus 2 includes a drum 4, a turnover bladder 6, bladder support ring 8, bladder clamp rings 10 and 12, and a control ring insert 14 inside the turnover bladder 6. There is also a bead ring carrier 16 on which is supported a bead ring B. The bead ring carrier 16 is moving the bead ring B toward the drum 4 as shown by the arrow a.

Carcass plies C are shown in FIG. 1 wrapped around the building drum 4 with their end portions CE draped over the end of the drum 4 and resting on top of the turnover bladder 6. When these carcass plies are placed on the drum 4, the cylindrical surface of the drum is at the position indicated by chain line 18. Then, the drum is expanded to the position shown in FIG. 1, with the ends of the carcass plies being pulled up to their draped position of FIG. 1.

The beads 20 and 22 of turnover bladder 6 rest on the bladder support ring and are clamped against the body of control ring insert 14 by clamp rings 10 and 12 respectively. In its fully deflated condition shown in FIG. 1, the turnover bladder 6 is folded upon itself with an outer fold 24 lying over and positioned radially outwardly from inner fold portions 26 and 28.

The outer bladder fold 24 has a substantially cylindrical portion 30 that is of a diameter less than that of the building drum 4, even when the drum 4 is at its retracted diameter indicated by chain line 18. A conical portion 32 of outer bladder fold 24 merges at its smaller diameter end with the cylindrical portion 30. From there, the conical portion 32 angles radially outwardly to a larger diameter end 34 that preferably has the same diameter as the cylindrical surface of drum 4 when that surface is in its retracted position indicated by chain line 18 (FIG. 1). The extent to which the conical portion 32 angles outwardly from the cylindrical portion 30 need not be great. In fact, only a one-half inch (12.7 mm.) difference between the diameter of the larger diameter end 34 and the diameter of the cylindrical portion 30 will suffice for the purpose of the present invention.

The larger diameter end 34 of the conical portion 32 is joined by a rounded, molded crease 35 to the inner bladder fold 26. The crease 35, together with the conical portion 32, are permanently molded in the bladder by a process and apparatus to be described later.

When the bladder 6 is completely deflated, the cylindrical portion 30 of outer bladder fold 24 is supported along part of its axial length by a cylindrical support surface 36 on bladder clamp ring 12. Of course, the inner bladder fold portion 28 is interposed between the cylindrical portion 30 and its support surface 36. The control ring insert 14 has an outer conical surface 38 that supports the conical portion 32 of outer bladder fold 24. Together, the conical surface 38 of control ring insert 14 and the cylindrical support surface 36 of the ring 12 give firm support to the outer bladder fold 24, so that the outer bladder fold 24 in turn gives firm support to either the carcass plies C or to a sidewall pad placed on the bladder fold 24.

In operation, the bladder 6 is in a completely deflated condition, as shown in FIG. 1, while the bead ring carrier 16 carries bead ring B over the outer fold 24 and carcass ply end portions CE resting on conical portion 30 of the bladder. Because of the conical shape of portion 30, the bladder end 34 can extend closer to the bead ring B than in previous ply turnover devices. At the same time, there is adequate spacing between the carrier 16 and bead ring B and the outer bladder fold 24 and carcass ply ends CE, as the bead ring B is carried over the bladder 6.

Figure 2:
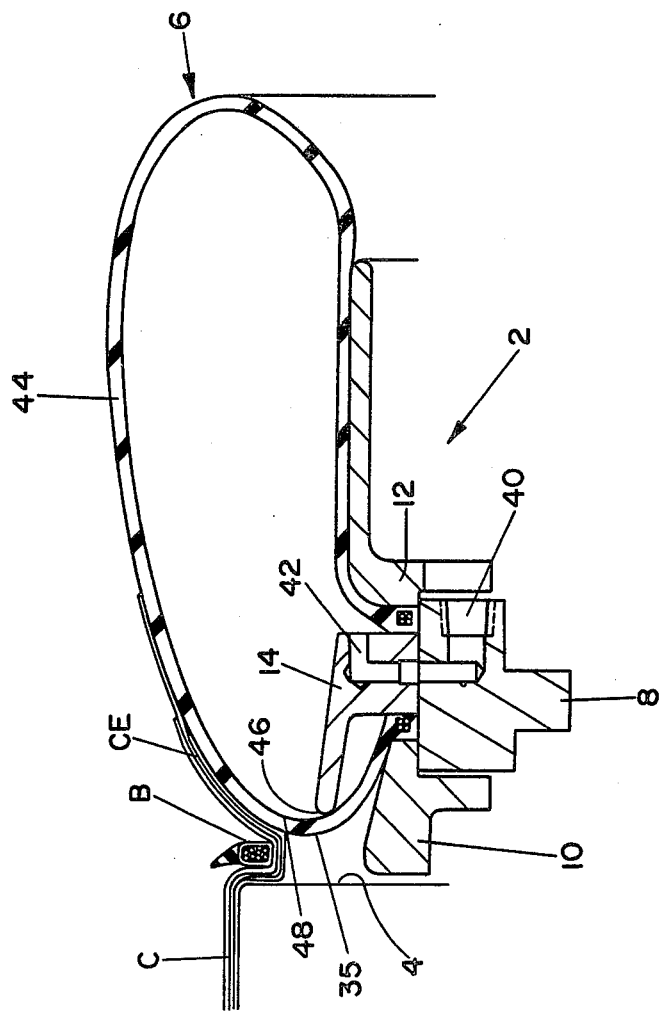
FIG. 2 is a partial cross-section of the apparatus of FIG. 1 with the bead ring in place adjacent the carcass plies, the bead ring carrier retracted out of view, and the turnover bladder in the process of expanding to turn up the ends of the carcass plies around the bear ring.

Once the bead ring B has been set in place at the end of building drum 4, as shown in FIG. 2, air is introduced into the bladder 6 through passageway 40 in bladder support ring 8 and passageway 42 in control ring insert 14. This air pressure causes the bladder 6 to inflate as shown in FIG. 2, with the axially outward portion 44 of the bladder inflating to the greatest degree, and the end 46 of control ring insert 14 limiting the outward movement of the axially inward bladder portion 48. The control ring insert 14 is positioned so that its end 46 allows the rounded crease 35 in the bladder 6 to move upwardly and axially outwardly a short distance before engaging the inner bladder fold portion 26. This results in the rounded crease 35 beginning its ply wrapping movement around the bead ring B. Then, the control ring insert engages the inner bladder fold portion 26 and prevents the rounded crease 35 from moving axially outwardly beyond the bead ring B. Instead, the crease 35 moves around the bead ring B to a position adjacent the axially outer edge of bead ring B, as shown in FIG. 3.

Figure 3:
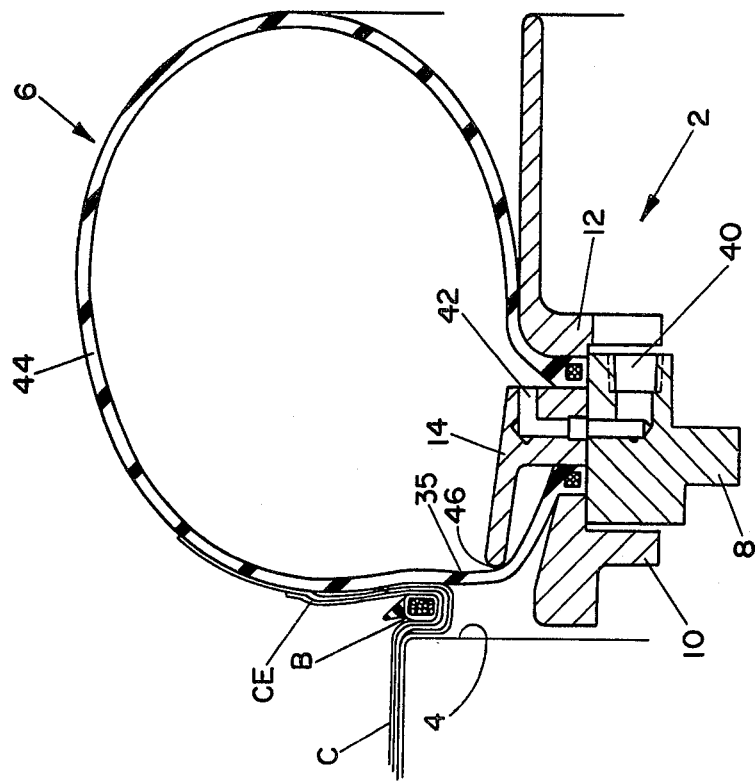
FIG. 3 is a partial cross-section of the apparatus of FIGS. 1 and 2 with the turnover bladder in a further expanded position from that of FIG. 2, but still in the process of turning up the ends of carcass plies.

As more air is introduced into the bladder 6, it assumes the shape shown in FIG. 3. In this position, the high air pressure in the bladder 6 causes the crease 35 and adjacent bladder portion to press the ply ends CE firmly against the outer face of the bead ring B. Meanwhile, the outer extremities of the ply ends CE are carried by the expanding bladder over the radially outward sides of the bead ring B.

Figure 4:
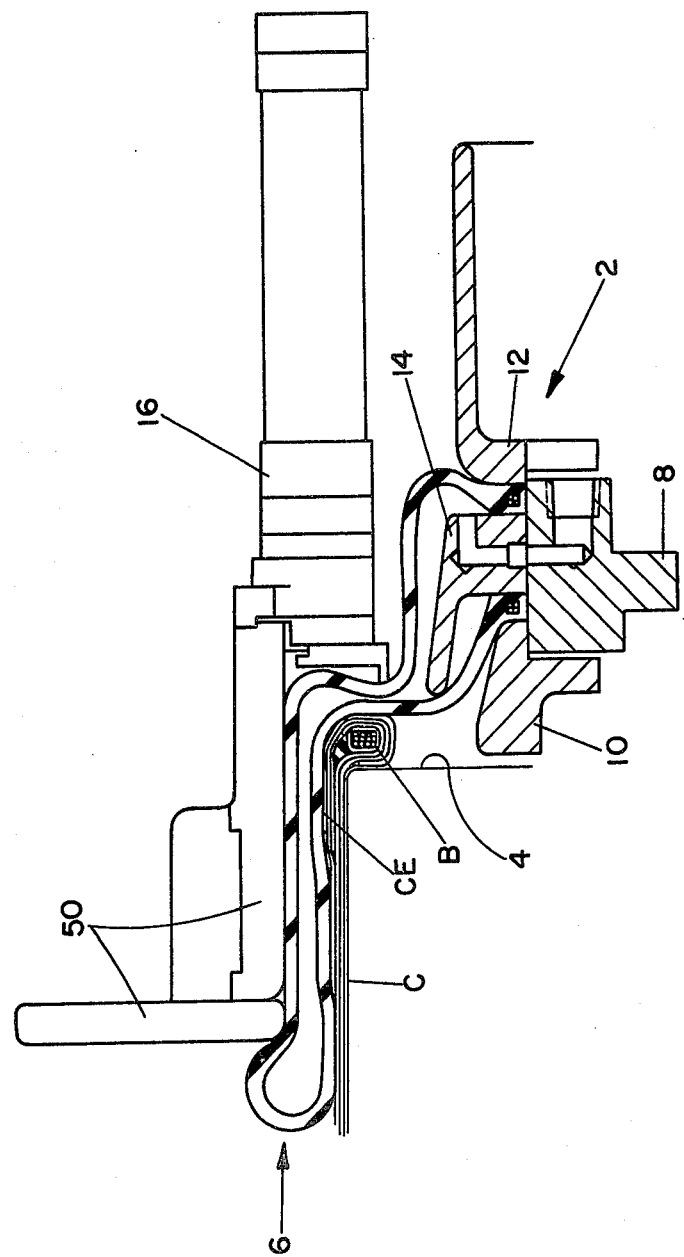
FIG. 4 is a partial cross-section of the apparatus of FIGS. 1 through 3, with the turnover bladder in an almost deflated condition and with the pushover ring of the bead ring carrier in the process of pushing the turnover bladder and carcass ply ends over the bead ring and against the main body of the carcass.

After the bladder 6 is fully inflated, as shown in FIG. 3, the bead ring carrier 16 is again moved axially inwardly toward the drum 4, as shown in FIG. 4. During this movement, bladder pushover ring 50 on the bead ring carrier pushes the bladder 6 over the carcass C on the drum 2. Simultaneously, air in bladder 6 is allowed to escape, so that the bladder finally assumes the position shown in FIG. 4, with the pushover ring 50 pressing the bladder 6 and carcass ply ends CE against the main body of the carcass C.

Figure 5:
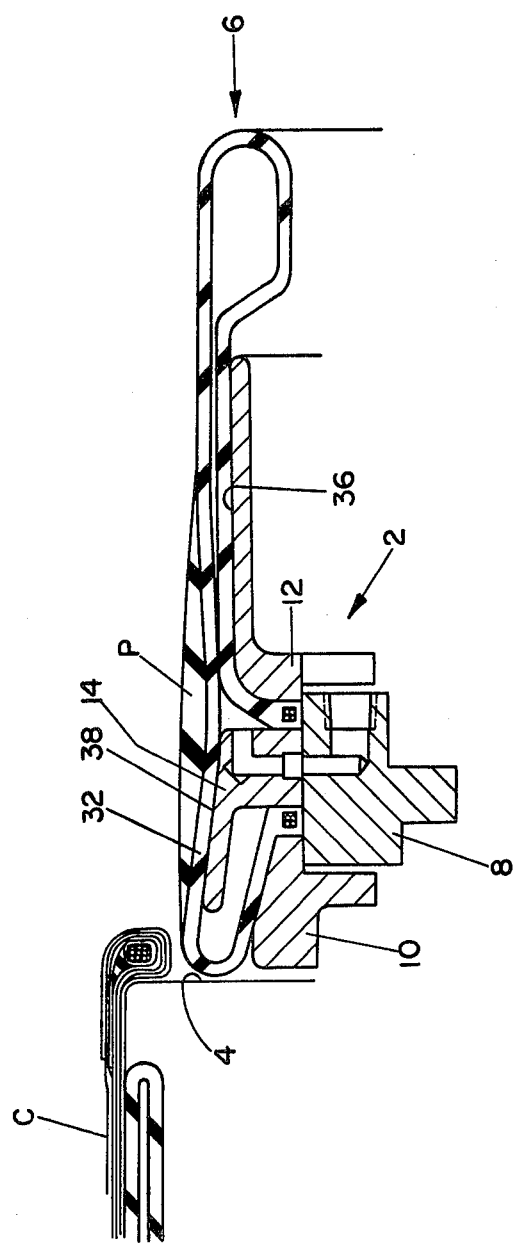
FIG. 5 is a partial cross-section view of the apparatus of FIGS. 1 through 4, with the turnover bladder once again in a completely deflated condition and with a sidewall pad laying on the external surface of the turnover bladder.
Figure 6:
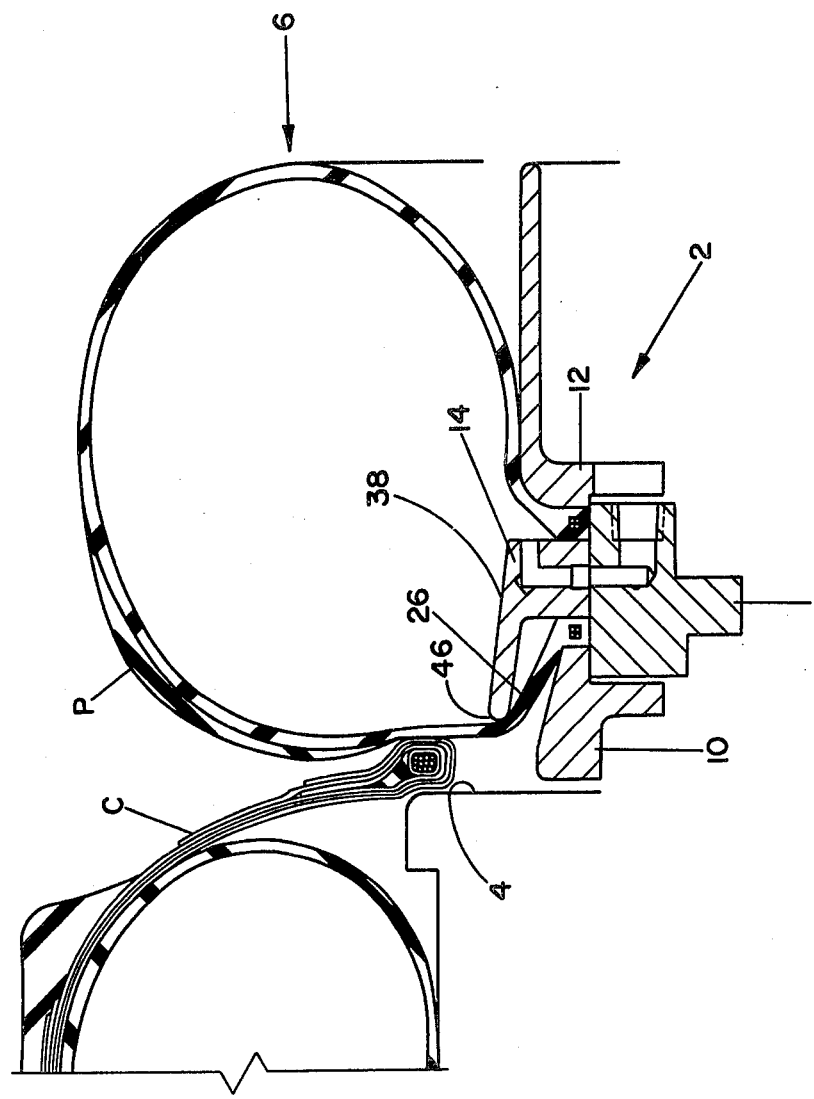
FIG. 6 is a partial cross-section of the apparatus of FIGS. 1 through 5, with the drum bladder and carcass in an expanded position and with the turnover bladder in the process of expanding to lift the sidewall pad toward the side of the expanded carcass.
Figure 7:
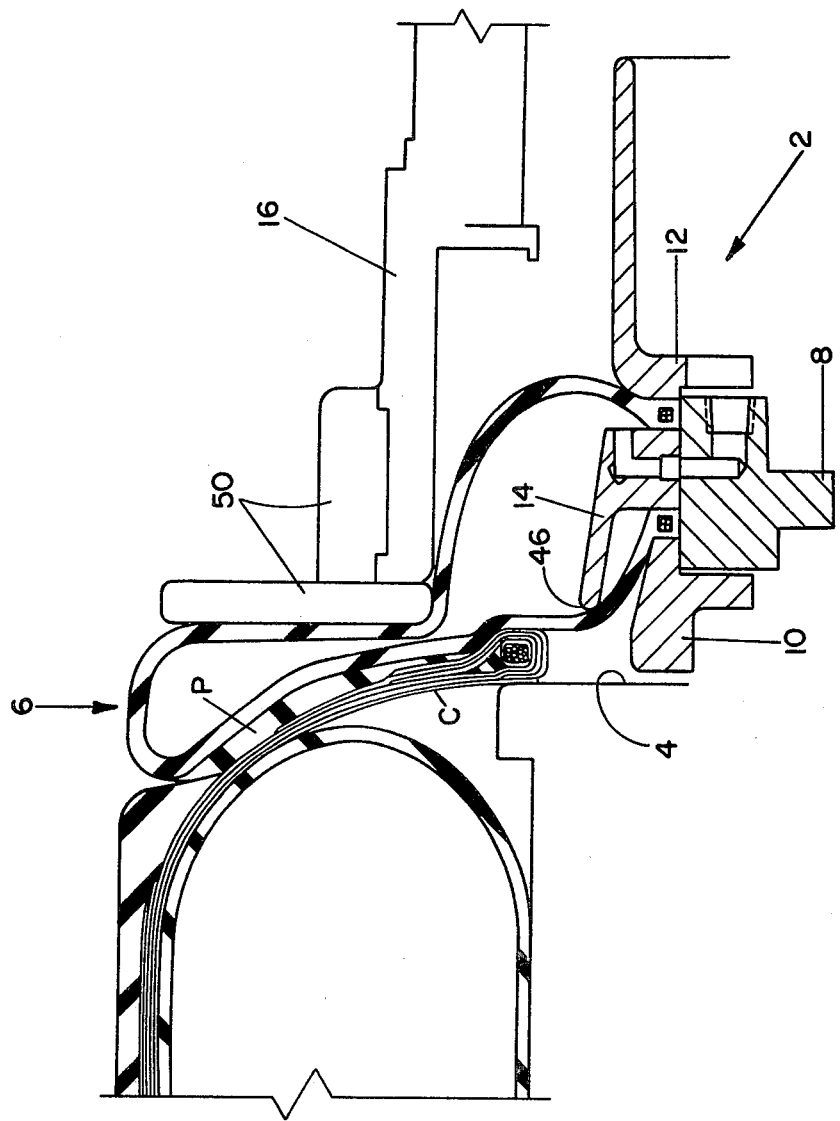
FIG. 7 is a partial cross-section of the apparatus of FIGS. 1 through 6 with the turnover bladder in an almost deflated condition, and the pushover ring on the bead ring carrier in the process of pushing the turnover bladder and sidewall pad against the expanded carcass.

The turnover bladder 6 may also be used to apply a sidewall pad P to the carcass C, as shown in FIGS. 5, 6, and 7. In FIG. 5, a sidewall pad P is shown laid with its external surface facing radially inwardly on the deflated bladder 6. The outer conical surface 38 of control ring insert 14 and the support surface 36 of bladder clamp ring 12 form a firm, contoured support for the external surface of sidewall pad P. With the sidewall pad P thus supported, a stitcher wheel may be run over the ends of the pad P without the pad sagging or buckling under the pressure of the wheel, this results in a more uniformly stitched sidewall pad.

FIG. 6 shows the bladder 6 expanding to lift the sidewall pad P toward an expanded carcass C. The end 46 of control ring insert 14 engages the inner fold portion 26 of the bladder 6 at a place that is fixed with respect to the area on the carcass C where the sidewall is to be applied. The sidewall pad P is initially laid on the bladder 6 knowing the length of bladder material that will extend between the end 46 of insert 14 and the place on the carcass C where the sidewall is to be applied. Thus, when the bladder 6 presses the sidewall pad P against the carcass C as shown in FIG. 7, the pad P is placed accurately on the carcass. The application of the sidewall pad P to the carcass C is completed by the bladder pushover ring 50 pressing the bladder 6 and sidewall pad P against the carcass C, with the air pressure in bladder 6 being simultaneously reduced (FIG. 7).

Figure 8:
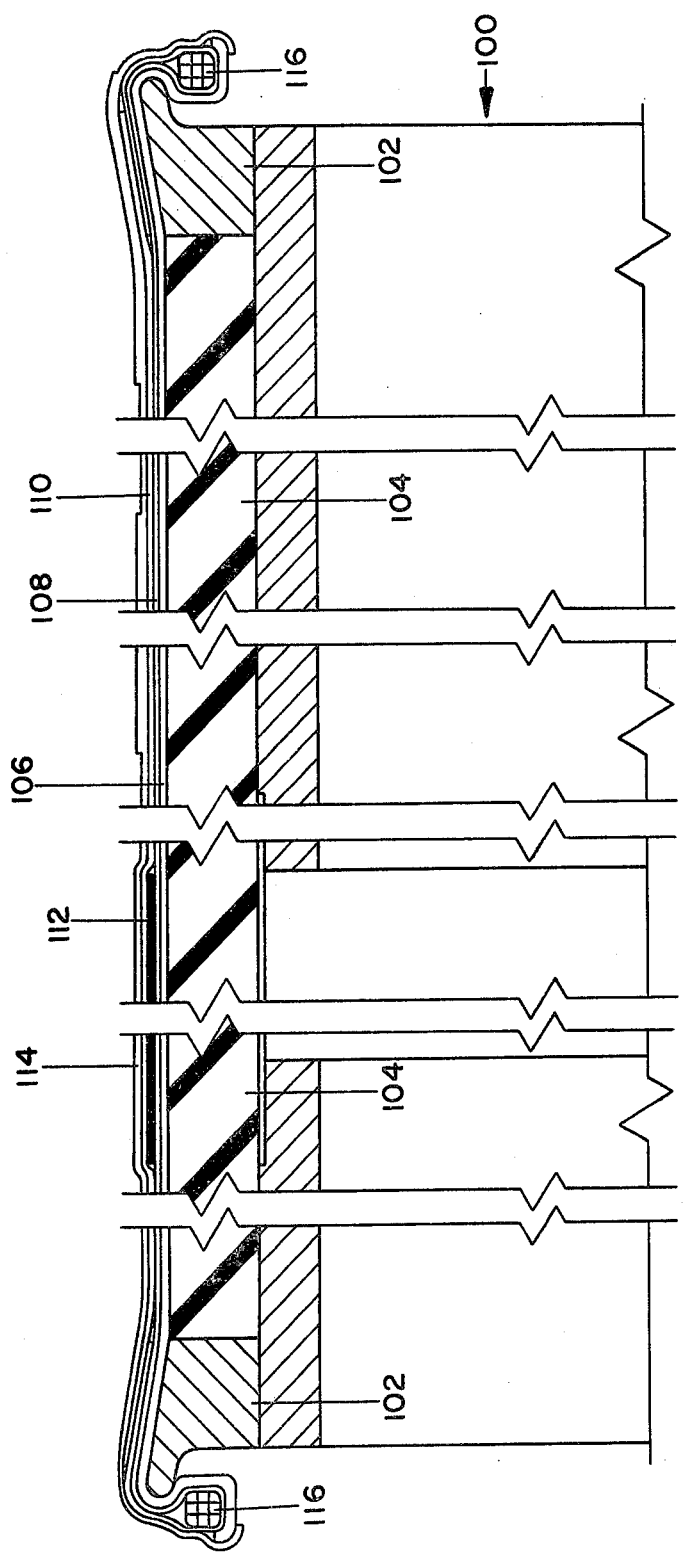
FIG. 8 is a partial cross-section of the turnover bladder of FIGS. 1 through 7 being built on a building drum.

The bladder 6 differs from other turnover bladders in that it has a conical portion 32 in its outer fold 24 that is joined to the inner bladder fold 26 by a rounded, molded crease 35. The conical portion 32 and molded crease 35 must be molded into the bladder, and for this purpose, a special molding method and apparatus are required for making the bladder 6. The apparatus for making the bladder 6 is shown in FIGS. 8 and 9.

The components of the bladder 6 are formed on a cylindrical mandrel 100 (FIG. 8) that has metal end rings 102, and a rubber sleeve 104 for supporting the uncured bladder 6. The components laid on the mandrel 100 are rubber inner liner 106, two fabric plies 108 and 110, a rubber squeegee 112 and a rubber cover 114. The ends of these plies are wrapped around beads 116 at the edges of the mandrel 100. The plies 108 and 110 are made of fabric cord members that extend between the beads 116 and are offset from the radial position by an angle of between 10° and 20°. The cord members of ply 108 are at an angle to one side of the radial position, while the cord members of ply 110 extend at substantially the same angle to the other side of the radial direction.

After the uncured bladder 6 is formed on the mandrel 100, it is removed from the mandrel and placed in a mold 116, shown in FIG. 9. The mold 116 comprises an external mold member 118, a mold insert 120, external mold pieces 122, 124 and 125, and an annular mold cap 126. An uncured bladder (not shown) is first placed in the external mold 118 with the mold insert 120, mold pieces 122 and 124, and cap 126 removed. Then, the mold insert 120 is placed in position with its mold surfaces 128 engaging the inside surfaces of the portion of the bladder that is to be molded into a conical shape. The mold pieces 122, 124 and cap 126 are then positioned around the conical portion of the bladder to form an annular V-shaped external mold cavity 130, and they are secured to the external mold 118 by bolts 132. The surfaces of the V-shaped cavity 130 are spaced from the surfaces 128 of the mold insert 120 by the same distance as the thickness desired in the molded conical portion of the bladder in any given cross-section. Thus, the portion of the bladder molded between the surfaces 128 and 130 is given a permanent, molded configuration that conforms accurately to dimensional specifications.

The axially outward portion of the bladder that is molded in cavity 130 of the mold 118 is formed by the conventional bladder molding technique of introducing air into the bladder after is is placed in the cavity 130. This air is introduced through passageway 134 in the mold insert 120.

After placement in the mold 116 according to the foregoing procedure, the bladder is heated in the mold for a time and at a temperature sufficient to cure it, whereupon the bladder is ready for use as bladder 6 in the apparatus shown in FIGS. 1 through 7.

While one embodiment of the present invention has been shown and described, other embodiments and modifications will of course be apparent to those skilled in the art, while remaining within the scope of the appended claims.

We claim:

1. A tire building apparatus having a building drum and an inflatable, cord reinforced, elastomeric, toroid shaped bladder disposed at an axial end of said building drum, said bladder being designed for turning up and wrapping the plies of a tire carcass around a bead ring positioned adjacent said axial end of said building drum and including an outer bladder fold having a substantially cylindrical portion that is of a diameter less then the diameter of said building drum when said bladder is completely deflated, said bladder also including an inner bladder fold disposed radially inwardly from said outer bladder fold, wherein the improvement comprises:
   (a) said outer bladder fold having a conical portion axially adjacent said building drum, said conical portion having a smaller diameter and merging with said cylindrical portion of the outer bladder fold and angling radially outwardly from said cylindrical portion to a larger diameter end that is located immediately beneath said bead ring when said bladder is completely deflated;
   (b) a portion of said inner bladder fold merging in a molded crease with the larger diameter end of said conical portion of said bladder fold; and
   (c) a control ring insert positioned within said bladder and between said inner and outer bladder folds, said control ring insert positioned axially outwardly of said molded crease, said control ring insert positioned to engage said inner bladder fold at a location adjacent said molded crease after the initial inflation of said bladder and restrain the said inner bladder fold and connected outer bladder fold from moving axially away from said bead ring when said bladder is further inflated.

2. The tire building apparatus according to claim 1 wherein said bladder is additionally designed to apply a sidewall pad to said tire carcass and said control ring insert having a conical outer surface that supports said conical portion of said outer bladder fold and the portion of said sidewall pad placed on said conical portion when said bladder is completely deflated.

3. The tire building apparatus according to claim 1 wherein said apparatus includes a cylindrical support surface supporting said substantially cylindrical portion of said outer bladder fold, said bladder being additionally designed to apply a sidewall pad to said tire carcass, and wherein the improvement further comprises said control ring insert having a conical outer surface that has a smaller diameter end near said cylindrical support surface and flares therefrom radially outwardly and toward said building drum, said cylindrical support surface and said conical outer surface of said control ring insert being positioned to give firm support to said bladder and to the contoured surface of a sidewall pad that is placed over said bladder.

4. The tire building apparatus of claim 1 wherein said toroid shaped bladder is reinforced by at least two cord plies, the cords of one ply extending at an angle of between 10° and 20° to one side of the radial position and the cords of the other ply extending at substantially the same angle as the cords of the other ply to the other side of the radial position.

5. The tire building apparatus of claim 1 wherein said control ring insert is positioned to engage said portion of said inner bladder at a position axially outwardly of said bead ring.

* * * * *

UNITED STATES PATENT AND TRADEMARK OFFICE
CERTIFICATE OF CORRECTION

PATENT NO. : 4,199,393
DATED : April 22, 1980
INVENTOR(S) : Robert L. Brown et al.

It is certified that error appears in the above-identified patent and that said Letters Patent are hereby corrected as shown below:

Column 7, line 26 which reads: "then" should read ---than---.

Signed and Sealed this

Twenty-ninth Day of July 1980

[SEAL]

Attest:

Attesting Officer

SIDNEY A. DIAMOND

Commissioner of Patents and Trademarks